(12) United States Patent
Venkatraman

(10) Patent No.: US 7,069,414 B2
(45) Date of Patent: Jun. 27, 2006

(54) PAGE HANDLING EFFICIENCY IN A MULTITHREADED PROCESSOR

(75) Inventor: K S Venkatraman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/940,894

(22) Filed: Sep. 13, 2004

(65) Prior Publication Data

US 2005/0033923 A1 Feb. 10, 2005

Related U.S. Application Data

(63) Continuation of application No. 10/179,817, filed on Jun. 24, 2002, now Pat. No. 6,810,472.

(51) Int. Cl.
*G06F 12/10* (2006.01)

(52) U.S. Cl. .................. 711/207; 711/154; 711/206

(58) Field of Classification Search .................. 711/3, 711/100, 118, 119, 123, 125, 126, 154, 203, 711/205, 207
See application file for complete search history.

(56) References Cited

U.S. PATENT DOCUMENTS

| 5,671,444 A | 9/1997 | Akkary et al. |
| 5,778,407 A | 7/1998 | Glew et al. |
| 5,781,790 A | 7/1998 | Abramson et al. |

*Primary Examiner*—Tuan V. Thai
(74) *Attorney, Agent, or Firm*—Fish & Richardson P.C.

(57) ABSTRACT

In a multithreaded processor, the efficiency of instruction processing may be improved by suspending an executing thread during the translation of a virtual memory address to a physical memory address when the address translation data must be retrieved from storage external to the processor. The suspension of an executing thread allows an address translation to be performed for an instruction in another thread while the address translation data needed for the first thread is retrieved.

24 Claims, 3 Drawing Sheets

PAGE HANDLING EFFICIENCY IN A MULTITHREADED PROCESSOR

CROSS-REFERENCE TO RELATED APPLICATIONS

This application is a continuation application of and claims priority to U.S. patent application Ser. No. 10/179,817, filed Jun. 24, 2002 now U.S. Pat. No. 6,810,472.

BACKGROUND

The following description relates to improving page handling performance in a multithreaded processor.

For a processor to execute an instruction, the instruction and data needed by the instruction typically are stored in the processor memory before the instruction is executed. This may require the translation of a virtual memory address used by an instruction to a physical memory address describing a storage location for the needed instruction or the data. The region of memory storing the instruction or data may be loaded into processor memory from storage (fetched) using the physical memory address. A processor may manage memory by organizing memory space into fixed-length portions (pages) that can be moved into, and out of, processor memory. The process of translating the virtual memory address and retrieving pages from storage may be referred to as page handling.

A processor may be capable of managing the execution of more than one thread (e.g., a set of independently executing instructions that are part of a processing task) at a time. It is advantageous for a processor to be able to execute instructions in a thread quickly.

DESCRIPTION OF DRAWINGS

Like reference symbols in the various drawings indicate like elements.

DETAILED DESCRIPTION

In a processor capable of managing the execution of multiple threads at one time (which may be referred to as multithreading ("MT"), Jackson technology ("JT"), or symmetric multithreading ("SMT")), the efficiency of instruction processing may be improved by suspending an executing thread during the translation of a virtual memory address to a physical memory address when the address translation data must be retrieved from storage external to the processor. The suspension of an executing thread allows an address translation to be performed for an instruction in another thread while the address translation data needed for the first thread is retrieved from storage external to the processor.

Figure 1:
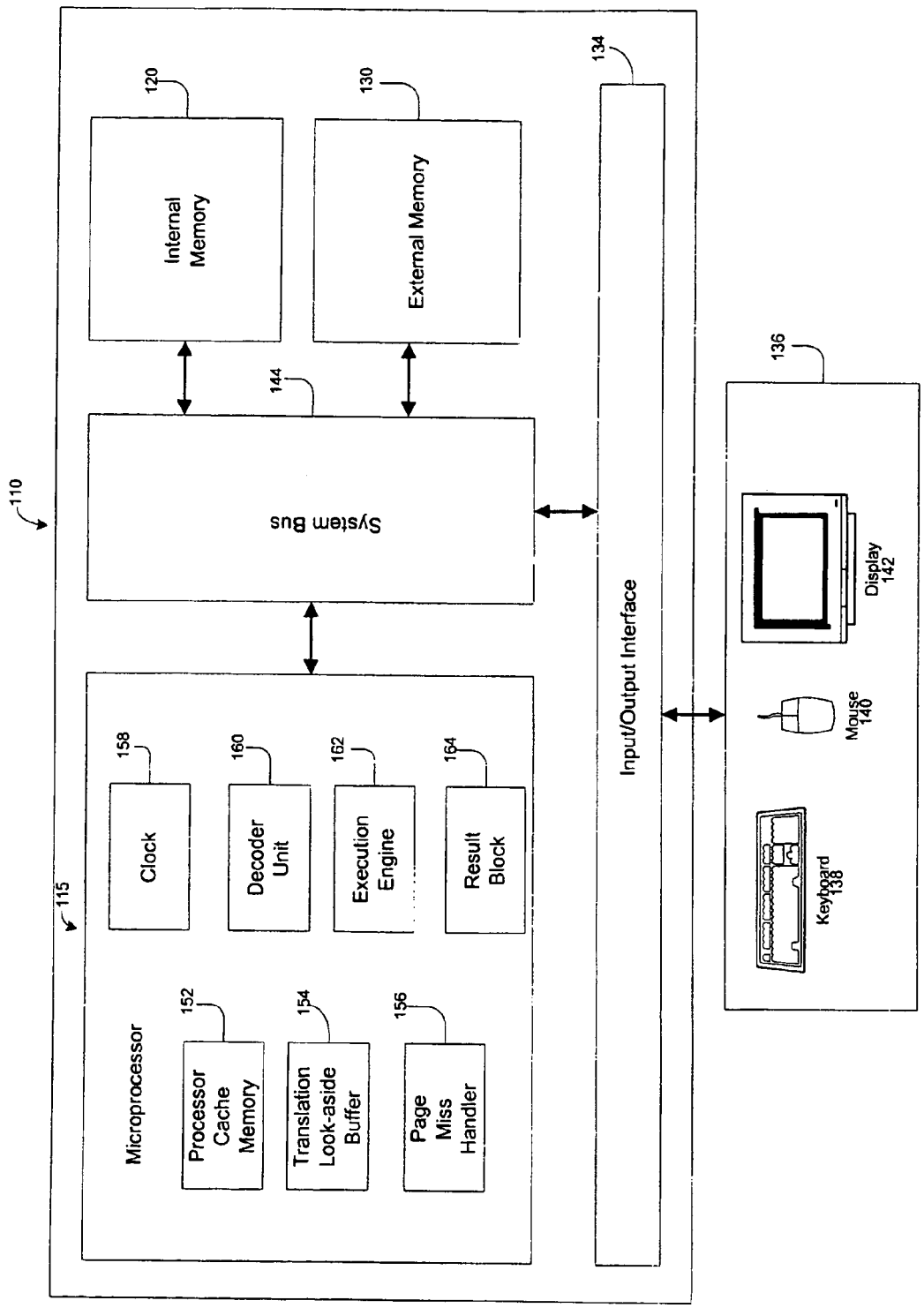
FIG. 1 is a diagram of a general-purpose computer containing a microprocessor.

Referring to FIG. 1, a typical general purpose computer 110 (such as a personal computer or laptop) includes a processor 115, which also may be referred to as a central processing unit ("CPU"), internal memory (also called main memory) 120, and external memory 130, and one or more input-output interfaces 134 that connect to various peripheral devices 136, such as a keyboard 138, a mouse 140, and a display monitor 142. A system bus 144 provides a series of parallel connections to allow communication between processor 115, internal memory 120, external memory 130, and input-output interface 134.

The processor 115 includes one or more processor memory caches 152 that store the most recently used instructions and data, and one or more translation look-aside buffers 154, which are small memory caches that store the virtual-to-physical address translation for a series of pages. The processor 115 also includes a page miss handler 156 that determines and stores the physical address for a received virtual address in a translation look-aside buffer. The processor also includes a clock 158 that generates a series of evenly spaced electronic pulses to coordinate activity within the processor, a decoder unit 160 that determines what actions are required by the instruction (e.g., add, subtract), an execution engine 162 that performs the decoded instruction, and a result block 164 that stores a pointer to an instruction and the result of the executed instruction. The processor 115 also may include additional components.

FIG. 1 illustrates a particular processor. However, the benefits of improving page handling efficiency in a multithreaded processor are not limited to that particular implementation. They are equally applicable to other implementations involving a multithreaded processor that performs page handling.

In general, as an instruction in a thread is executed, the page miss handler 156 retrieves the physical memory address translation for a virtual memory address of a page that stores a subsequent instruction or data needed by the executing instruction. To do so, the page miss handler 156 uses a series of address translation tables (also referred to as page lookup tables) that store translation data for translating virtual memory addresses to physical memory addresses. The address translation tables are retrieved from storage external to the processor (typically, from main memory) and stored in processor cache memory as the address translation data is needed by the page miss handler. After determining the physical memory address translation, the page miss handler may store the physical memory address in a translation look-aside buffer, which may be used by the processor in retrieving the needed page from storage.

The page miss handler generally is not available to perform a subsequent address translation until the physical memory address for a previous address translation request has been stored in the translation look-aside buffer. The operational efficiency of the page miss handler improves when the address translation data needed by the page miss handler for a particular address translation have been stored in processor cache memory. However, if the address translation data must be retrieved from storage external to the processor (such as main memory or external storage), the page miss handler may be idle during the retrieval, which is less efficient.

The efficiency of thread execution may be improved in a processor by reducing the amount of time during which a page miss handler is idle. This may be accomplished by suspending the execution of a particular thread when the address translation data needed by the page miss handler in processing the particular thread must be retrieved from storage external to the processor. Page handling efficiency may be improved because the page miss handler is not idle during the period of time required for retrieving the address translation data from storage and the page miss handler is available to translate another virtual address for an instruction in a different execution thread.

Figure 2:
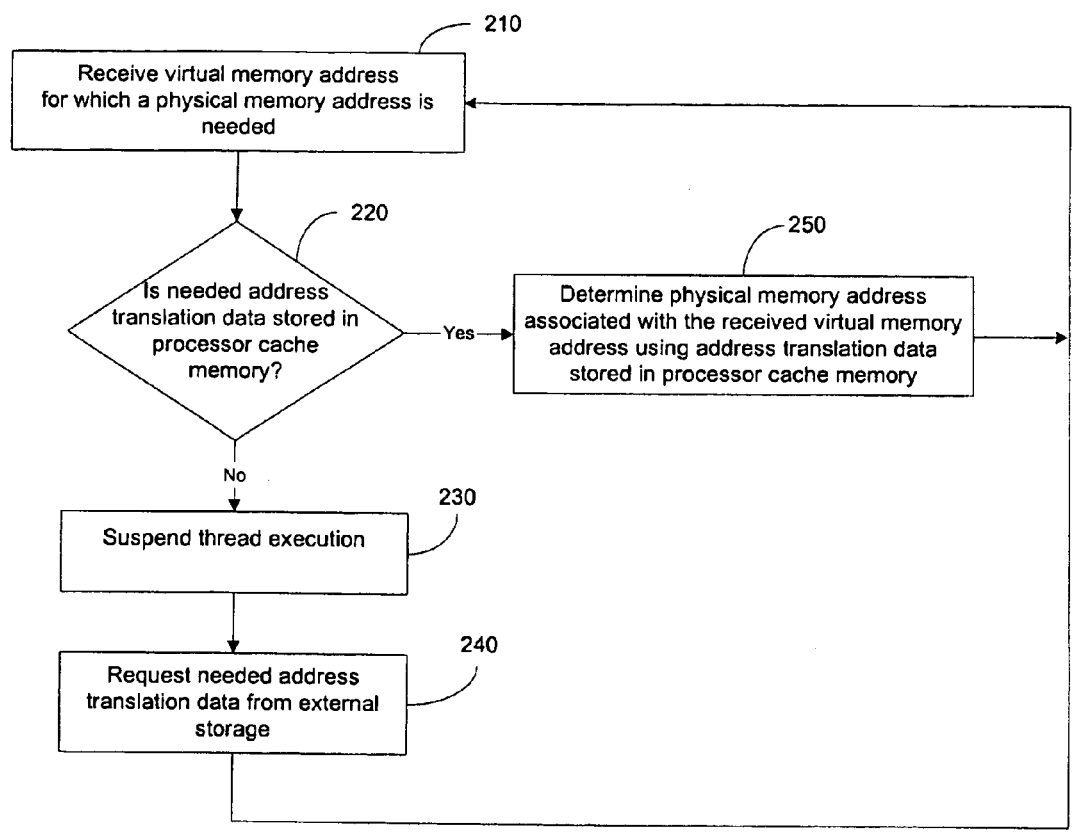
FIGS. 2 and 3 are flow charts illustrating processes for page handling performance in a multithreaded processor.

Referring to FIG. 2, a process 200 controls the processor to suspend thread execution when address translation data must be retrieved from storage external to the processor.

Initially, the processor receives a virtual memory address for which a physical memory address is needed (210). The processor then determines whether the address translation data needed to translate the received virtual memory address into the associated physical memory address is stored in processor cache memory (220). If not, the processor suspends the execution of the particular thread from which the virtual memory address was received (230), and requests retrieval of the address translation data needed for the received virtual address from storage external to the processor (e.g., main memory or external memory) (240). The processor then receives a virtual memory address for an instruction in another executing thread (210) and proceeds as described above. However, if the needed address translation data is stored in processor memory (220), the processor determines the physical memory address associated with the received virtual memory address using the address translation data stored in processor memory (250). The processor then receives another virtual memory address to translate (210), and proceeds as described above.

Figure 3:
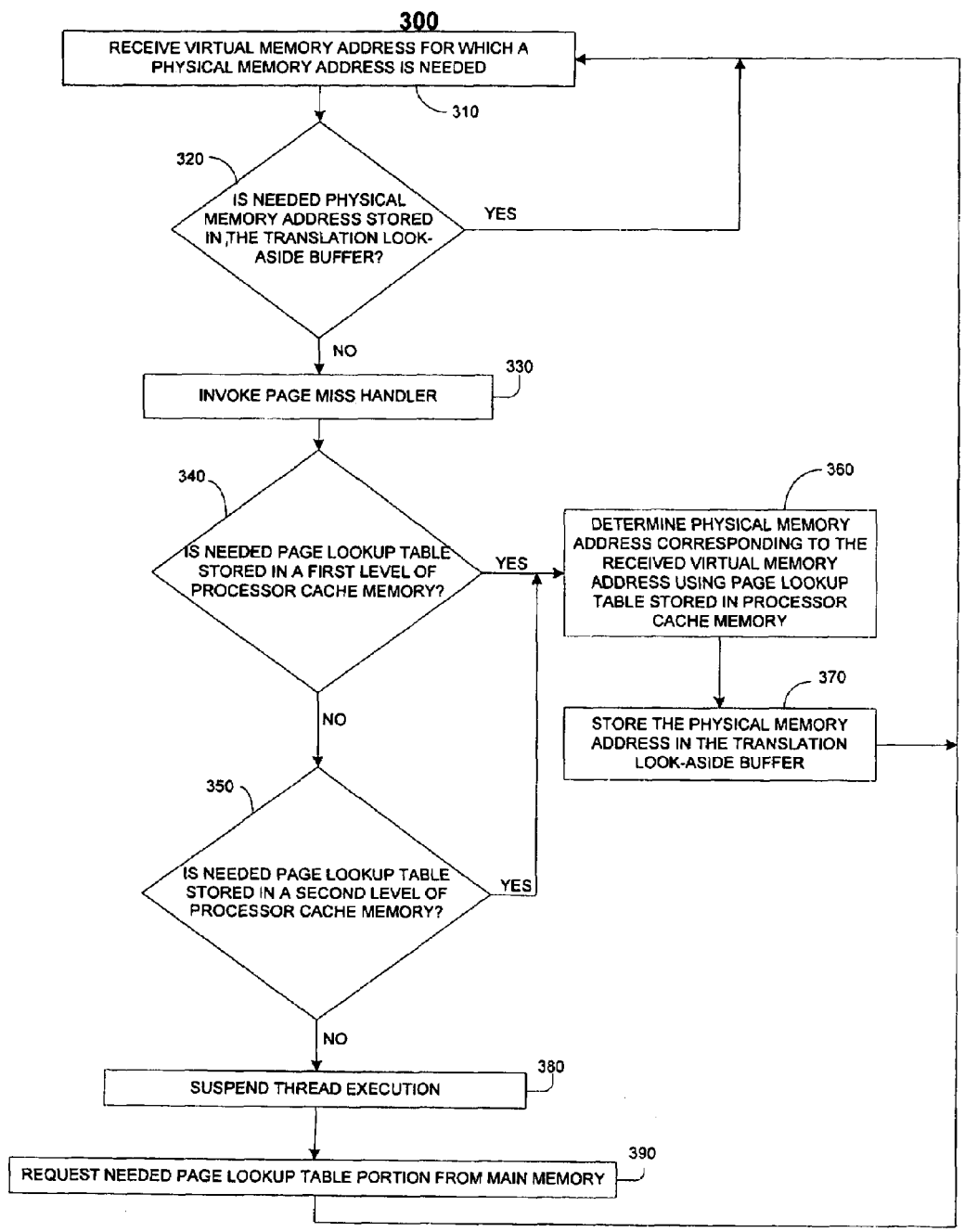

FIG. 3 illustrates a process 300 that controls a particular implementation of a multithreaded processor to suspend execution of a thread when address translation data must be retrieved from storage external to the processor. In the described implementation, the processor includes a translation look-aside buffer capable of storing sixty-four virtual-to-physical memory address translations and processor cache memory having two levels. Level zero cache ("L0") is memory closest to the core of the processor and only serves the instruction stream of a thread. Level one cache ("L1") serves both the data stream and instruction stream of a thread and may also be called unified level one cache ("UL1"). Two methods may be used to access level one cache. A fast request cache lookup returns a probable result as to whether the data is present in the level one cache, and a full cache lookup returns a certain result that the data is or is not present in the level one cache. A page lookup table stores the translation of virtual memory addresses to physical memory addresses and is stored in main memory.

As FIG. 3 illustrates, the process 300 begins when the processor receives a virtual memory address for an instruction for which a physical memory address is needed (310). The processor determines whether the corresponding physical memory address is stored in the translation look-aside buffer by looking up the received virtual address of the needed instruction (320). If the physical memory address is found, the process is complete as to the translation of the virtual memory address, and the processor receives a virtual memory address from the current or another execution thread (310).

However, if the physical memory address is not found in the translation look-aside buffer, the processor invokes the page miss handler (330) to translate the received virtual memory address and store a physical memory address associated with the received virtual memory address in the translation look-aside buffer. The processor determines whether the portion of the page lookup table needed by the page miss handler for the received virtual memory address is stored in L0 cache (340), and, if not, the processor determines, by using a fast request cache lookup or a full cache lookup, whether the needed page lookup table portion is stored in L1 cache (350).

If the needed page lookup table portion is located in L0 or L1 cache, the processor determines the physical memory address corresponding to the received virtual memory address by looking up the received virtual memory address in the page lookup table stored in the appropriate processor cache memory (L0 or L1)(360). The processor then stores the physical memory address associated with the received virtual memory address in the translation look-aside buffer (370) and begins again by a receiving a new virtual memory address (310) as previously described.

If the needed page table lookup portion is not stored in either L0 or L1 cache, the processor suspends the thread execution (380), which allows the page miss handler to handle a virtual address memory translation request from another executing thread. The processor also requests the needed page lookup table portion from main memory (390) so that the needed page lookup table portion may be stored in processor cache memory the next time that the suspended thread is executed. The processor then receives a virtual memory address for which a physical memory address is needed (310) and proceeds as previously discussed.

Although a particular implementation of a thread suspension on a page miss handler operation process has been used for illustrative purposes, the benefits of improving thread execution performance are not limited to that particular implementation but are equally applicable to other implementations. For example, the benefits may be applicable to implementations using various sizes of page memory (e.g., 4 KB, 2 MB, 4 MB); implementations using more than one translation look-aside buffer (e.g., using one translation look-aside buffer for storing address translation data for instructions and a second translation look-aside buffer for storing address translation data for data); implementations using multiple levels of translation look-aside buffers in which each level is checked sequentially (for instance, in the same way that process 300 controls the processor to check the multiple levels of processor cache L0 and L1 in FIG. 3); and implementations using separate processor cache memory for instructions and for data.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

What is claimed is:

1. A page handling method for a multithreaded process, the method comprising:

receiving a virtual memory address from an instruction in an executing thread at a multithreaded processor having a page miss handler and a processor memory that includes a first level of processor memory and a second level of processor memory, determining whether address translation data which associates a physical memory address with the received virtual memory address is stored in the first level of processor memory, when the address translation data is not stored in the first level of the processor memory, determining whether the address translation data is stored in the second level of processor memory, and when address translation data for the received virtual memory address is not stored in the first level of processor memory and is not stored in the second level of processor memory, suspending the executing thread and requesting retrieval from a storage location external to the processor of address translation data for the received virtual memory address.

2. The method of claim 1 wherein determining whether the address translation data is stored in the second level of processor memory comprises using a cache lookup that returns a probable result as to whether the address translation data is stored in the second level of processor memory.

3. The method of claim 1 wherein determining whether the address translation data is stored in the second level of processor memory comprises using a cache lookup that returns a certain result as to whether the address translation data is stored in the second level of processor memory.

4. The method of claim 1 wherein receiving a virtual memory address from an instruction in an executing thread at a multithreaded processor comprises receiving a virtual memory address for an instruction from an instruction in the executing thread.

5. The method of claim 4 wherein the first level of processor memory comprises only an instruction cache memory.

6. The method of claim 4 wherein the second level of processor memory comprises a unified cache memory that serves both a data stream and an instruction stream of the executing thread.

7. The method of claim 1 wherein receiving a virtual memory address from an instruction in an executing thread at a multithreaded processor comprises receiving a virtual memory address for data from an instruction in an executing thread.

8. The method of claim 7 wherein:
the first level of processor memory comprises only an instruction cache memory; and
the second level of processor memory comprises a data cache memory.

9. The method of claim 1 wherein the address translation data comprises a page lookup table.

10. The method of claim 1 wherein:
receiving a virtual memory address comprises receiving a virtual memory address from an instruction in an executing thread at a multithreaded processor having a page miss handler, a processor memory that includes a first level of processor memory and a second level of processor memory, and a translation look-aside buffer,
determining whether address translation data is stored in the first level of processor memory comprises determining whether address translation data which associates a physical memory address with the received virtual memory address is stored in the first level of processor memory or in the translation look-aside buffer, and
suspending the executing thread and requesting retrieval from a storage location external to the processor comprises doing so when address translation data for the received virtual memory address is not stored in the first level of processor memory, is not stored in the second level of processor memory, and is not stored in the translation look-aside buffer.

11. The method of claim 10 further comprising, when address translation data is stored in the first level of processor memory or is stored in the second level of processor memory, determining a physical memory address corresponding to the received virtual memory address using the address translation data and storing the physical memory address in the translation look-aside buffer.

12. The method of claim 10 wherein the translation look-aside buffer is capable of storing sixty-four address translations of a physical memory address to a virtual memory address.

13. A page-handling apparatus for a multithreaded process, the apparatus comprising:
a multithreaded processor, including:
a processor memory that includes a first level of processor memory and a second level of processor memory and is configured to store at least one association between a virtual memory address and a physical memory address, and
a page miss handler configured to determine a physical memory address associated with a virtual memory address,
wherein the multithreaded processor is configured to:
receive a virtual memory address from an instruction in an executing thread,
determine whether the address translation data which associates a physical memory address with the received virtual memory address is stored in the first level of processor memory,
when the address translation data for the received virtual memory address is not stored in the first level of processor memory, determine whether the address translation data which associates a physical memory address with the received virtual memory address is stored in the second level of processor memory, and
when the address translation data for the received virtual memory address is not stored in the first level processor memory and is not stored in the second level of processor memory, suspend the executing thread and request retrieval from a storage location external to the processor of address translation data for the received virtual memory address.

14. The apparatus of claim 13 wherein the multithreaded processor is further configured to use a cache lookup that returns a probable result as to whether the address translation data is stored in the second level of processor memory.

15. The apparatus of claim 13 wherein the multithreaded processor is further configured to use a cache lookup that returns a certain result as to whether the address translation data is stored in the second level of processor memory.

16. The apparatus of claim 13 wherein the multithreaded processor is further configured to receive a virtual memory address for an instruction from an instruction in the executing thread.

17. The apparatus of claim 16 wherein the first level of processor memory comprises only an instruction cache memory.

18. The apparatus of claim 16 wherein the second level of processor memory comprises a unified cache memory that serves both a data stream and an instruction stream of the executing thread.

19. The apparatus of claim 13 wherein the address translation data comprises a page lookup table.

20. The apparatus of claim 13 further comprising a translation look-aside buffer configured to store a physical memory address and a virtual memory address, and
wherein the multithreaded processor is further configured to:
determine whether address translation data which associates a physical memory address with the received virtual memory address is stored in the first level of processor memory or in the translation look-aside buffer, and
suspend the executing thread and request retrieval from a storage location external to the processor when address translation data for the received virtual memory address is not stored in the first level of processor memory, is not stored in the second level of processor memory, and is not stored in the translation look-aside buffer.

21. The apparatus of claim 20 wherein the multithreaded processor is further configured to, when address translation data is stored in the first level of processor memory or is stored in the second level of processor memory, determine a physical memory address corresponding to the received virtual memory address using the address translation data and store the physical memory address in the translation look-aside buffer.

22. A computer-readable medium having embodied thereon a computer program configured to cause a processor to implement a page-handling technique, the computer program comprising code segments configured to cause a processor to:
   receive a virtual memory address from an instruction in an executing thread at a multithreaded processor having a page miss handler and a processor memory that includes a first level of processor memory and a second level of processor memory,
   determine whether address translation data which associates a physical memory address with the received virtual memory address is stored in the first level of processor memory,
   when address translation data for the received virtual memory address is not stored in the first level of processor memory, determine whether address translation data which associates a physical memory address with the received virtual memory address is stored in the second level of processor memory, and
   when address translation data for the received virtual memory address is not stored in the first level of processor memory and is not stored in the second level of processor memory, suspend the executing thread and request retrieval from a storage location external to the processor of address translation data for the received virtual memory address.

23. The medium of claim 22 wherein the code segments are configured to cause the processor to:
   determine whether address translation data is stored in the first level of processor memory by determining whether address translation data which associates a physical memory address with the received virtual memory address is stored in the first level of processor memory or in a translation look-aside buffer, and
   suspend the executing thread and request retrieval from a storage location external to the processor when address translation data for the received virtual memory address is not stored in the first level of processor memory, is not stored in the second level of processor memory, and is not stored in the translation look-aside buffer.

24. The medium of claim 23 further comprising a code segment configured to cause the processor, when address translation data is stored in the first level of processor memory or is stored in the second level of processor memory, to determine a physical memory address corresponding to the received virtual memory address using the address translation data and store the physical memory address in the translation look-aside buffer.

* * * * *